Aug. 6, 1935.   A. F. HULL ET AL   2,010,155
APPARATUS FOR WELDING DRUMS
Filed Jan. 30, 1933   3 Sheets-Sheet 3
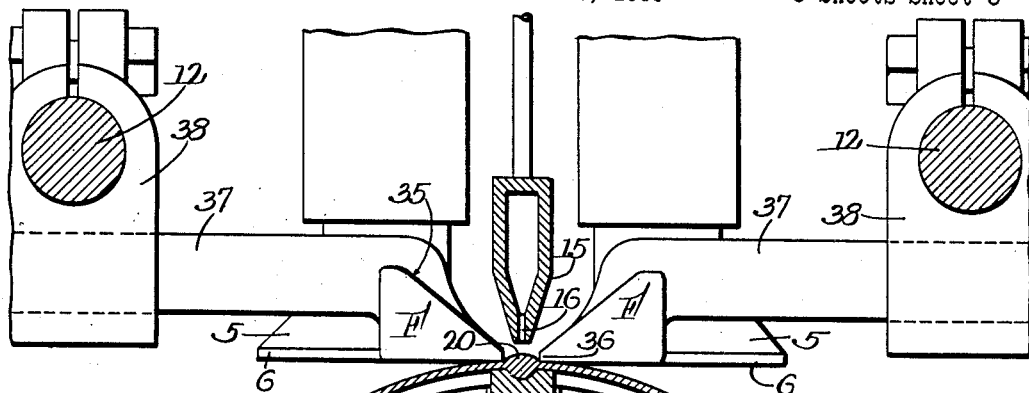
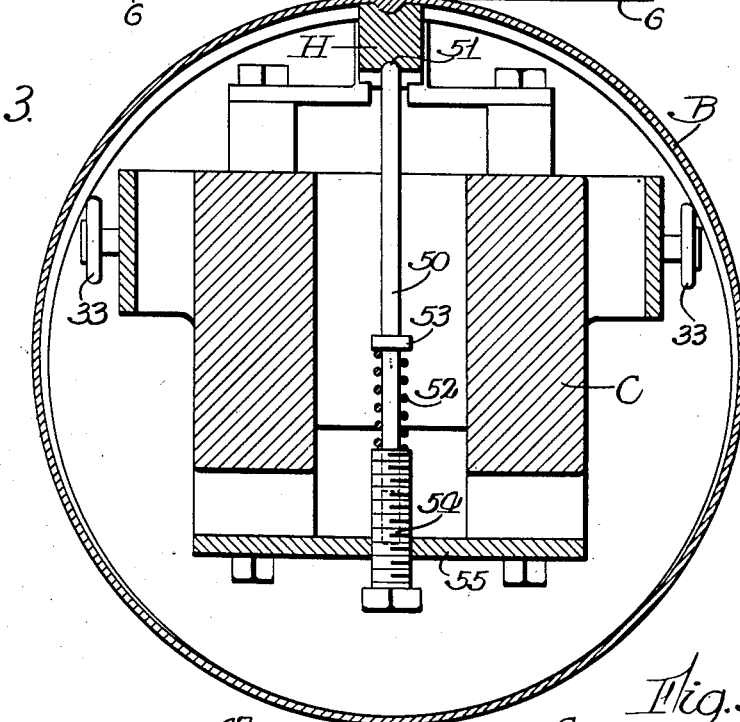
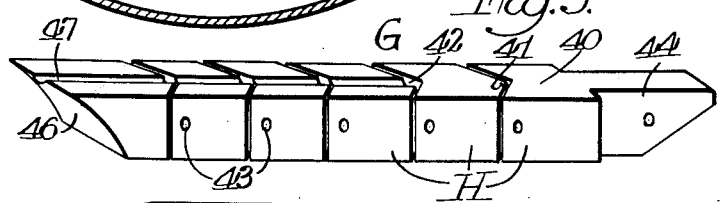
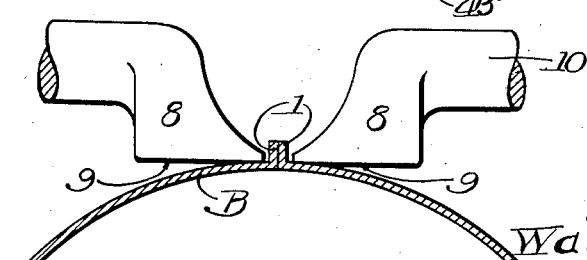
Inventors:
Arthur F. Hull
Walter P. Johnson
By: George I. Haight
Atty.

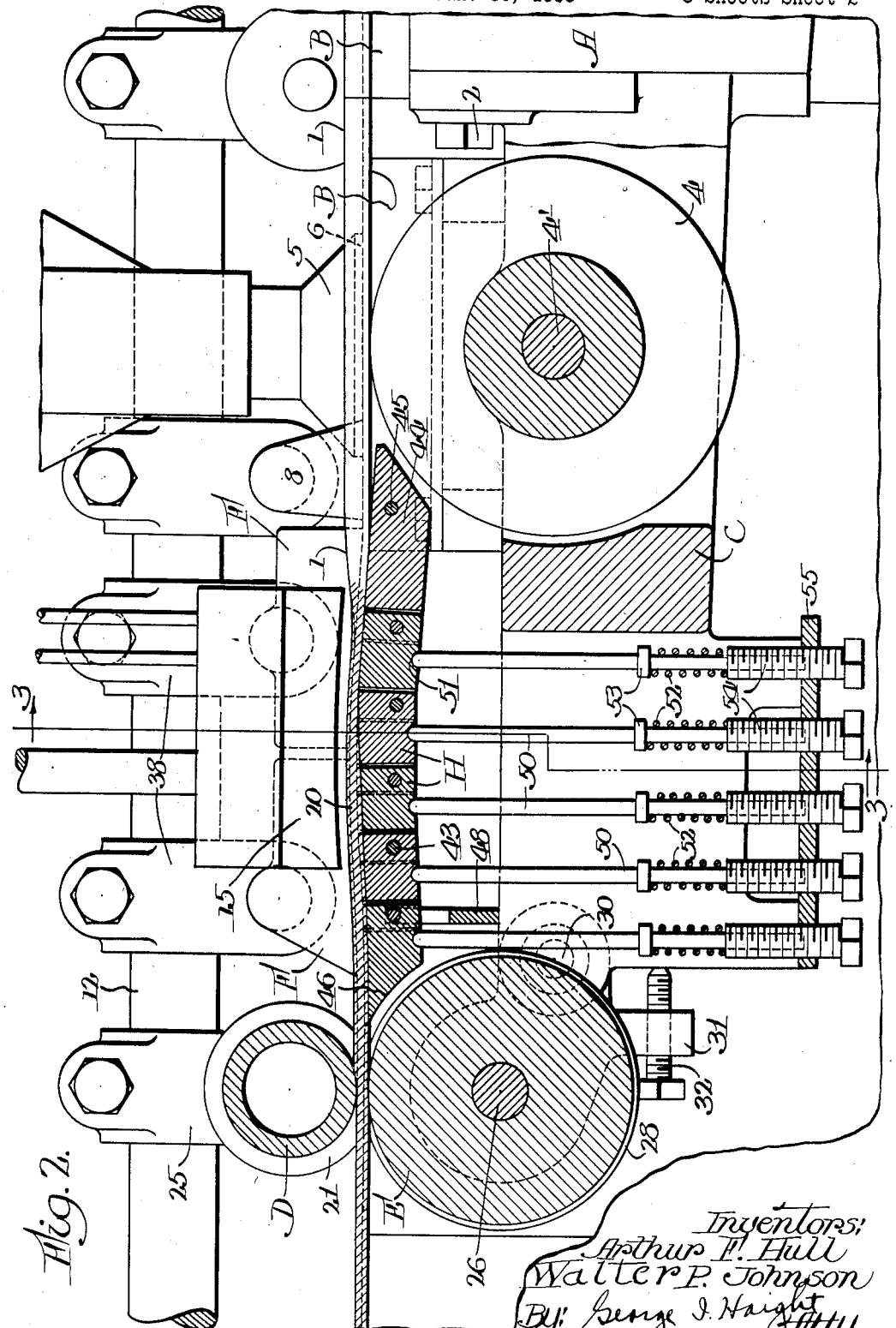

Patented Aug. 6, 1935

2,010,155

UNITED STATES PATENT OFFICE 2,010,155

APPARATUS FOR WELDING DRUMS

Arthur F. Hull and Walter P. Johnson, Los Angeles, Calif., assignors to The Boyle Manufacturing Company, Inc., Los Angeles, Calif., a corporation of California Application January 30, 1933, Serial No. 654,168

8 Claims. (Cl. 113—59)

This invention relates to the welding of the longitudinal seams of cylindrical shells, drums or the like formed from sheet metal with the edges brought into seam relation.

The present invention involves means for the continuous formation of the weld along the seam and the forging or compressing of metal in the area of the seam while the metal is still in a heated condition as a result of the welding operation for the purpose of squeezing and thereby eliminating any gases which may have been intruded into the weld or any pockets or voids resulting from the welding process, thereby rendering the welded seam more homogeneous in character, stronger and entirely free from leaks, and thereby thinning out and smoothing the metal in the area of the seam.

The invention also involves the provision of means acting on both inner and outer surfaces of the metal contiguous to the seam to maintain the metal in definite position and prevent it from sagging or becoming distorted during the welding operation.

The invention also involves various other features of construction and arrangement of the mechanism which perform these operations, and which are pointed out in fuller detail in the following specification and shown in the accompanying drawings which illustrate one embodiment of the invention.

The term "drum" as used herein is intended to include shells, tubes or other forms or articles in which seams are to be formed by welding adjoining edges or margins of sheet metal brought together for that purpose.

Referring to the accompanying drawings, Fig. 1 is a plan view of that portion of a continuous welding machine embodying the invention, certain parts of the mechanism being broken away and other parts being shown in section to better illustrate the structure and the process of forming seams.

Fig. 2 is a vertical, longitudinal view partly in section on the line 2—2 of Fig. 1 through the line of the seam.

Fig. 3 is a transverse, vertical, sectional view on the line 3—3 of Fig. 2.

Fig. 4 is an enlarged, detailed view of the guide shoes and their relation to the article being welded; and Fig. 5 is a perspective view of the flexible backing-up shoe which bears against the underneath surface of the article beneath the seam thereof.

Figure 1:
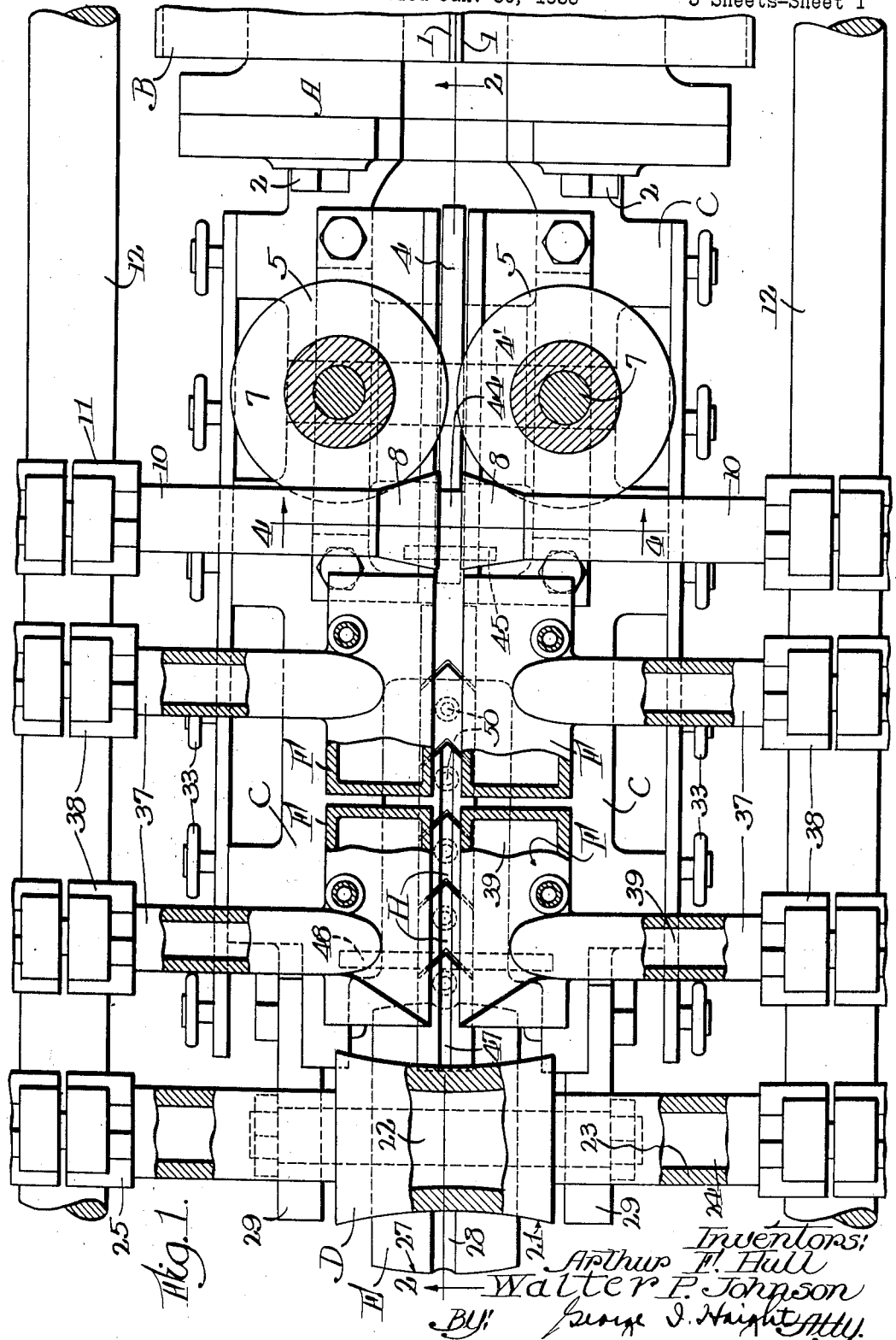

The present invention is applicable to a type of welding machine which is designed to feed forward in one direction a procession of bodies such as drum bodies in end to end abutting relation, so that as the procession moves forward, no gaps will be presented between successive drums. A continuous welding machine of this character is embodied in the Patent No. 1,980,164, issued November 1934 to Willis J. Boyle, Jr., and Leland S. Rosener. This machine is designed to act upon metal sheets bent to cylindrical form with their edges placed in welding relation to form a longitudinal seam. The abutting edges of the bodies along which the seam is formed are flanged outwardly, and the machine employs feed rolls which grip the flanges on opposite sides of the joint for the purpose of feeding the drums forwardly, and at the same time holding the flanged edges closely together during the period of time that the joint is subjected to the action of the welding means.

In order that the drums may be passed through the machine in successive order, the drums are fed into the machine at one end and discharged at the other end, and for this purpose the machine is designed to permit the drums to be slipped on to the rear end of the machine with the seam down and sufficiently extended to clear the rear support for a beam or stake which supports the operating parts and the drum in its progress through the machine. After the drum is slipped on to the rear end of the machine, it is rotated to present the seam with its flanged edges upwardly in position to be gripped by the feeding rolls and fed forwardly, as above mentioned, through the feeding and welding and forging mechanism. In the present drawings only those parts of the complete machine are shown in which the present invention is embodied.

The welding machine has a long horizontally disposed stake, which is supported at its rear end by a thin plate-like web upstanding from the base of the machine, so that the unwelded drums can be slipped on to the stake with their seams downwardly and opened sufficiently to straddle the stake support. After being slipped on to the stake the drums are then rotated to present their seams upwardly in position to pass through the welding mechanism.

In the accompanying drawings the forward portion of the stake A is illustrated, and (in Fig. 1) the end portion of a flanged drum B is illustrated in position on the stake about to enter the welding mechanism. As shown more clearly in Fig. 4, the drum B is formed of sheet metal, and the edges of the sheet, which are to be joined, are provided with outstanding flanges 1. It will be understood, however, that the invention is not limited to the formation of welded joints of drums having flanged edges, since it is obvious that the welded joint may be formed at abutting or overlapping edges of the sheet metal.

That portion of the welding and forging mechanism which is surrounded or enclosed by the drum as it passes through the machine is supported in a suitable frame C which is mounted upon the end of the stake by means of the bolts 2, as more clearly shown in Figs. 1 and 2. This frame carries a plurality of aligned anti-friction rollers 3 which engage the interior surface of the drums (Fig. 3) on opposite sides of the center seam, and it points considerably below the seam so as to steady the drums and prevent any lateral movement as they pass through the machine.

Adjacent the end of the stake there are provided two feeding rolls 5, which rotate on vertical axes and which are tapered or beveled outwardly to narrow rims 6 disposed in the line of the drum flanges and spaced apart sufficiently to firmly grip these flanges therebetween in order to feed the drums forwardly. These feed rolls are mounted on vertical shafts 7 journaled in suitable bearings 8 in a frame for holding them in proper position. The feed rolls are power-driven, and are designed to rotate at a speed which constantly urges each drum into end to end abutting relation with the preceding drum, but since the mechanism which operates the feed rolls does not constitute a part of the present invention, it is not illustrated.

Adjacent the feed rolls there are positioned two stationary guide shoes 8 which constantly engage the drum emerging from between the feed rolls. These guide shoes have flat under-surfaces 9 which, as more clearly shown in Fig. 4, bear upon the exterior surface of the drum adjacent the flanges, and serve to hold the marginal edges of the drum in exact horizontal alignment preparatory to welding. The guide shoes are formed at the ends of horizontal arms 10 which at their outer ends have split clamping members 11. These clamping members are mounted on horizontal bars 12 disposed in parallel relation on opposite sides of the machine, so that the shoes can be rotatably and longitudinally adjusted with respect to the drums to adapt them to different sizes. The parallel bars extend along the welding and forging mechanism, and serve as supports for the adjustable mountings of other parts of the welding and forging mechanism hereinafter described.

As the drums pass beyond the feed rolls and guide shoes just described, they immediately enter what is conveniently termed the welding zone which is defined by the position of the welding means. This welding means in the present structure is constituted by a welding tip 15. The welding means may be of any suitable type for the purpose. That which is shown in the drawings is of oxy-acetylene torch type, the tip 15 of which is elongated in the direction of the seam, and the under-edge of which is provided with a plurality of jet openings 16 directed toward the seams to be welded so as to project the welding flames directly upon the seam.

The drums leave the guide shoes 8 and advance progressively into the welding zone beneath the welding torch 15 which, as shown in Fig. 2, fuses edges. The flanges 1 of the drums are melted or fused down in the welding zone and lose their identity as such. These flanges supply the additional metal desirable in the formation of the seam. The metal of the flanges and of the margins contiguous to the seam is flowed together under the influence of the welding temperature and piles up to some extent (Fig. 3) along the seam in the form of a ridge which may be somewhat irregular and of varying thickness. In addition, gases may be intruded into the more or less molten metal and form pockets when the metal cools down, resulting in leaks in the seam.

These defects are overcome by forging or swaging the metal of the seam after the welding operation has been performed. This is accomplished by passing the seam between a pair of forging or swaging rolls D and E positioned sufficiently close to the welding zone so that as the metal leaves these rolls it will still be in a sufficiently molten or softened condition to be compressed or squeezed into more intimate relation and to remove any gas pockets which may have been formed. The softened metal is spread in a manner to seal leaks which might otherwise have occurred because of the gas pockets. These swaging rolls D and E (Figs. 1 and 2) are positioned adjacent the exit end of the welding zone. The upper roll D is smaller in diameter than the lower roll, and is positioned to bear upon the upper side of the seam. It is of substantial width but its periphery 21 is concave to correspond to the outer curvature of the drum. Since the upper roll is subjected to a greater degree of heat and wear it is made hollow to provide an interior chamber 22, and is mounted upon a hollow shaft 23 forming an interior passage 24 through which water may be circulated for cooling purposes. The shaft 24 is horizontally disposed transversely of the machine, and is journaled at its ends in bearing blocks 25 which are split to form clamping members embracing the supporting bars 12, so that the bearing members may be adjustable along said supporting bars and the upper roll C thereby adjusted to the desired position.

The lower forging roll D is suitably mounted upon a horizontal shaft 26, and its periphery 27 is convex to correspond to the inner curvature of the drum. This lower roll is of considerably larger diameter and serves in the nature of an anvil against which the drum and the metal of the seam are squeezed or compressed in passing between the rolls. Since there is an excess of metal at the seam the periphery of the lower roll is provided with a circumferential groove 28 so that a portion of the excess thickness of metal can be forced toward the interior of the drum, and thereby provide a flatter and smoother seam on the exterior of the drum. The rolls and the groove, together with the spacing of the rolls, are so proportioned that the metal of the seam will be subjected to a powerful squeezing or forging action for the purpose of smoothing out the irregularities in the seam, and rendering the metal of the seam more homogeneous and finer grained. Thus the possibility of leaks in the finished joint is reduced to a minimum, and the strength of the joint uniformly increased. The shaft 26 of the lower roll is journaled in bearings formed in suitable brackets 29 which are pivotally mounted at 30 in the frame C whereby the lower roll can be given a rotary movement toward or from the upper roll. The brackets 29 have downwardly depending arms 31 through which adjusting screws 32 extend and bear at their ends against the frame C. By virtue of this construction the lower roll may be adjusted to accurately regulate the pressure exerted by the rolls on the metal in accordance with such conditions as variation in the gauge of metal of the drums and the formed seam.

The application of heat to the metal, especially relatively thin sheet metal of which drums or shells are made, causes considerable expansion and a tendency to distort. This expansion or distortion, in a continuous machine of this character, takes the form of a raised portion or bulge along the line of the seam, especially where the heating zone is of appreciable length. The bulge thus formed is greatest in substantially the middle of the heating zone, and tapers off to normal towards both ends of the heating zone somewhat in the manner illustrated in Fig. 2 where the metal is shown as being curved upwardly out of a straight line in the heating zone beneath the welding torch. While it is not desirable to attempt to entirely prevent the formation of this expanded portion or bulge, it is desirable to confine the metal in the heating zone in such manner that it will not sag or run when in molten condition. For this reason several stationary shoes F are provided on each side of the seam and as close to the seam as is practicable and still leave space between the shoes for the welding flame. In the present structure there are two of these shoes F on each side of the seam. These shoes are similar in construction to the guide shoes 8 hereinbefore described, except that they are considerably greater in length so as to extend over a greater length of the drum metal contiguous to the seam. The under or bearing surfaces of these shoes are curved or arched longitudinally to conform as nearly as possible to the curvature of the bulge in the metal. The under edge of the torch tip is also similarly curved to maintain uniform spacing of the torch from the metal. The upper surfaces 35 of these shoes diverge from narrow opposed edges 36 upwardly away from the welding torch to provide sufficient room for the torch and space the shoes as far as possible from the heat of the torch. These shoes are, like the guide shoes 8, provided with horizontal arms 37 which are mounted in split clamping blocks 38 which embrace the bars 12, whereby the shoes may be adjusted vertically and horizontally to regulate their position very accurately. On account of the fact that these shoes are located in close proximation to the welding zone and hence are subjected to high temperature, the shoes and the arms 37 are preferably made hollow to form passages 39 through which water is circulated for the cooling purposes of cooling the shoes.

Now in order to force the metal of the drum upwardly against the under surfaces of the stationary shoes, and prevent any sagging or flowing of the molten metal in the vicinity of the seam, there is provided an elongated backing-up or pressure shoe G (Figs. 5 and 6). This backing-up shoe extends not only beneath the welding zone but to a considerable extent beyond either end of said welding zone. The upper surface 40 of the shoe is curved or arched transversely to correspond to the curvature of the interior surface of the drum. The shoe is made up of a series of sections H which are flexibly connected to each other to render the shoe as a whole flexible and thereby capable of adapting itself to the curvature of the metal in the bulge. In order that the upper surface 40 of the shoe may be substantially continuous the sections H are formed with V-shaped tongues 41 at one end and V-shaped grooves 42 at the opposite end, and are arranged in line so that the tongues of each section extend into the grooves of the adjacent section. The sections are linked together by pivot pins 43 which extend through the tongue and grooved end of each section, the walls of the tongues and grooves being spaced apart sufficiently to permit of sufficient relative movement between the sections. The forward end section 44 is provided with a longer parallel faced tongue which is positioned in a slot in the frame C, and pivotally fastened by means of the pivot pin 45 which holds the shoe against longitudinal movement. The opposite end section has a curved end face 46 which conforms to the curvature of the lower swaging roll, and enables the supporting effect of the shoe to be extended as close to the swaging roll as possible. Several of the rear sections have aligned grooves 47 in their upper faces 40 for accommodating seam metal in preparation for the passage through the swaging rolls. The rear section of the shoe is guided in the slot formed between the arms 48 in the frame C to prevent lateral movement.

The backing-up shoe is conformably pressed against the under side of the seam by means of a series of spring actuated push rods 50 (Figs. 2 and 3) which are disposed vertically beneath the shoe. One of these rods is provided for each intermediate section of the shoe and one for the trailing or rear end section of the shoe. The upper ends of the rods bear in sockets 51 in the shoe sections, and adjacent the lower end portions the push rods are surrounded by spiral springs 52 which are positioned between collars 53 on the rods and the ends of individual adjustment bolts 54, which are supported in a plate 55 secured to the lower portion of the frame C. The lower ends of the push rods telescope within the ends of the adjusting bolts so that the rods will be guided at their lower ends. Thus each push rod, and the shoe section which it actuates, can be individually adjusted for pressure by screwing the corresponding adjustment bolt upwardly or downwardly to compress or elongate the spiral springs 52. By virtue of this construction, the action of the flexible backing-up shoe will be responsive to the continually forming bulge as the drum progresses through the machine, and will act to constantly force the metal against the stationary water-cooled shoes throughout the length of the welding zone.

The structure shown and described illustrates the preferred form of mechanism for carrying the invention into effect, but it is obvious that changes may be made in the construction operation and arrangement of the parts without departing from the spirit of the invention, and such changes are contemplated as fairly fall within the scope of the appended claims.

We claim:

1. In a machine for welding the longitudinal seams of drums, the combination of stationary welding means, feeding mechanism for moving the drums successively in one direction with their seams in welding relation to said welding means, fixed shoes bearing upon the exterior surface of the moving drum contiguous to the welding zone, a relatively stationary shoe yieldingly acting on the interior surface of the drum beneath the seam for forcing the metal of the drum against the fixed shoes to prevent distortion of the metal during the welding operation, and rolls positioned adjacent the welding means and bearing upon the metal of the seam as it leaves the welding means.

2. In a machine for welding individual drums in successive order, the combination of a supporting stake along which the drums are moved in one direction one succeeding the other, welding means positioned to weld the drum seams as the drums pass said welding means, shoes bearing upon the exterior of the drum adjacent the welding zone, a yielding shoe bearing against the interior surface of the drum beneath the seam for preventing distortion of the drum in the heating zone, and rollers disposed to bear upon the metal of the drum seams as the seam leaves the welding zone.

3. In a machine for welding drum seams the combination of a stationary welding means, feeding mechanism for feeding the drums in successive order in welding relation to said welding means, stationary shoes positioned adjacent to the welding means and bearing upon the drum and conformed to the form which the drum metal takes under the influence of the welding temperature, a flexible pressure shoe disposed beneath the seam, and means causing said shoe to support the drum metal against said stationary shoes as the seam passes the shoes in accordance with the form thereof, and seam gripping rolls positioned to engage the seam as it leaves the welding zone.

4. In a continuously operating machine for welding drum seams moving in one direction through the machine in end-to-end relation the combination of a stationary welding means, feeding mechanism for feeding the drums in successive order in welding relation to said welding means, stationary shoes positioned adjacent to the welding means and bearing upon the drum adjacent the seam and conformed to the form which the drum metal takes under the influence of the welding temperature, a flexible pressure shoe disposed adjacent the welding means and beneath the seam and including a plurality of sections flexibly linked together, and individually adjustable spring means acting on each section to support the seam metal against the stationary shoes as the seam passes said shoes in conformance with the form of said stationary shoes.

5. In a machine for welding drum seams the combination of a stationary welding means, feeding mechanism for feeding the drums in successive order in welding relation to said welding means, stationary shoes positioned adjacent to the welding means and bearing upon the drum and conformed to the form which the drum metal takes under the influence of the welding temperature, and a pair of pressure rolls adjacent the welding means having peripheries curved to conform substantially to the curvature of the drums and adapted to grip the welded seam therebetween.

6. In a machine for welding drum seams in successive order, the combination of a stationary welding means, feeding mechanism for moving the drums successively in one direction in welding relation to said welding means, stationary shoes positioned adjacent the welding means to bear upon the exterior of the drum adjacent the seam thereof, and a flexible pressure shoe within the drum for maintaining the metal against said stationary shoes as the drums move past the welding means, said pressure shoe comprising a plurality of sections pivotally linked together in end-to-end relation, individual rods bearing on the individual sections of the shoe, spring means acting on said rods, and means for individually adjusting the action of said springs.

7. In a machine for welding drum seams in successive order, the combination of a stationary welding means, feeding mechanism for moving the drums successively in one direction in welding relation to said welding means, stationary shoes positioned adjacent the welding means to bear upon the exterior of the drum adjacent the seam thereof, a flexible pressure shoe disposed within the drum and bearing against the seam and metal contiguous thereto to maintain the metal against the stationary shoes and comprising a plurality of individual sections having V-shaped tongue and groove ends and arranged in end-to-end relation to form a continuous pressure surface and pivotally connected together, a plurality of vertically disposed rods bearing individually on the sections of the shoe, and adjustable spring pressure means acting on said rods.

8. In a welding machine of the character described, the combination of pairs of gripping rolls between which the drum seams pass, said pairs of rolls being spaced apart, a stationary welding means disposed between said pairs of rolls, exterior stationary shoes bearing upon the drum metal adjacent said welding means and a stationary pressure device disposed beneath the said stationary shoes and acting to force the metal of the drum against said stationary shoes as the drum moves, said pressure device being disposed between the pairs of rolls and having its ends in immediate proximity to the peripheries of the rolls and comprising a plurality of overlapping sections flexibly linked together in end-to-end relation, and a plurality of individual spring-actuated rods bearing against said individual sections to conform the shoe to the irregularities in the metal of the drum.

ARTHUR F. HULL.
WALTER P. JOHNSON.